United States Patent [19]

Jacobson

[11] Patent Number: 4,530,245

[45] Date of Patent: Jul. 23, 1985

[54] STRAIN MEASURING APPARATUS AND METHOD OF MAKING SAME

[75] Inventor: Walter E. Jacobson, Meriden, Conn.

[73] Assignee: Revere Corporation of America, Wallingford, Conn.

[21] Appl. No.: 542,725

[22] Filed: Oct. 17, 1983

[51] Int. Cl.³ .............................................. G01B 7/18
[52] U.S. Cl. .................................................... 73/768
[58] Field of Search ..................... 73/768, 786, 862.65, 73/862.66, 862.67, 783

[56] References Cited

U.S. PATENT DOCUMENTS 3,184,964   5/1965   Hedrick et al. .................. 73/862.65
3,695,096  10/1972   Kutsay ........................ 73/862.66 X

FOREIGN PATENT DOCUMENTS 1518359  7/1978  United Kingdom .
2050624B  1/1981  United Kingdom .

Primary Examiner—Jerry W. Myracle

[57] ABSTRACT

This strain measuring apparatus shows a device to be press fitted into a hole in a member subject to stress, for the purpose of measuring the strain produced in the member by that stress. The device is a cylindrical shell with a middle portion knurled on its outer surface so that it has an overall diameter slightly greater than the diameter of the hole in which it is to be inserted. A web extends across the interior of the middle portion of the shell perpendicular to its axis. Strain gage elements are attached to the surfaces of the web.

12 Claims, 22 Drawing Figures

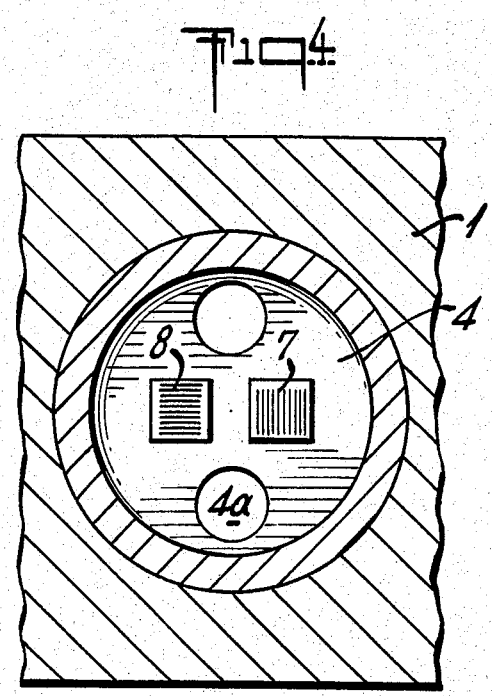
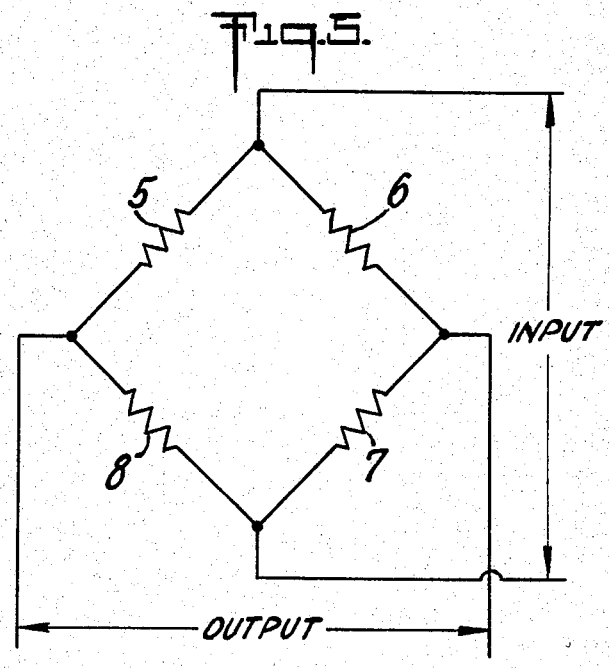
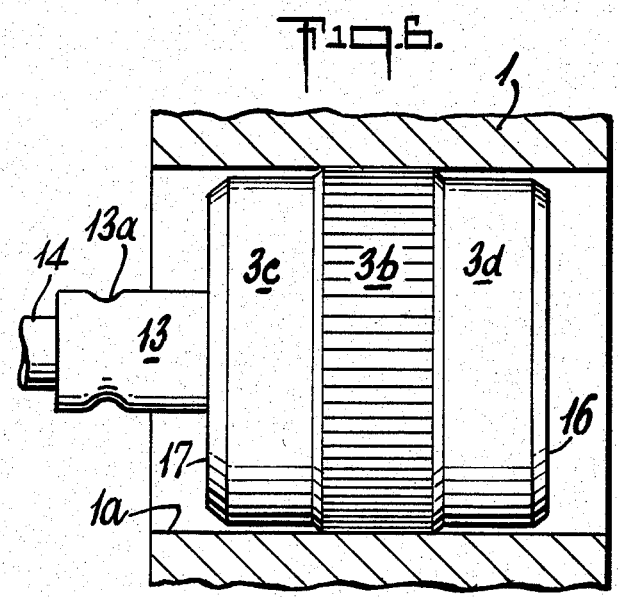
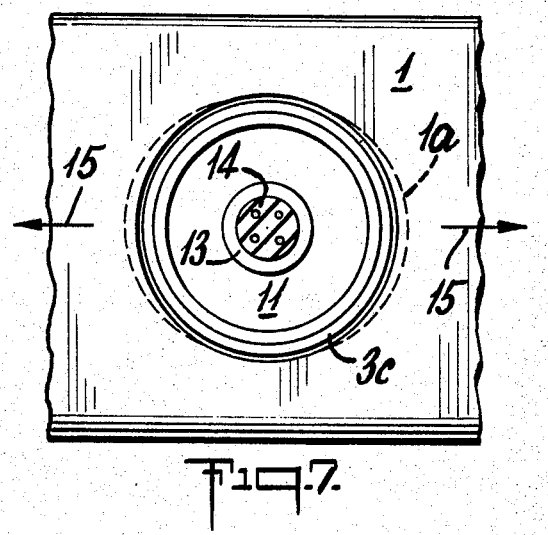
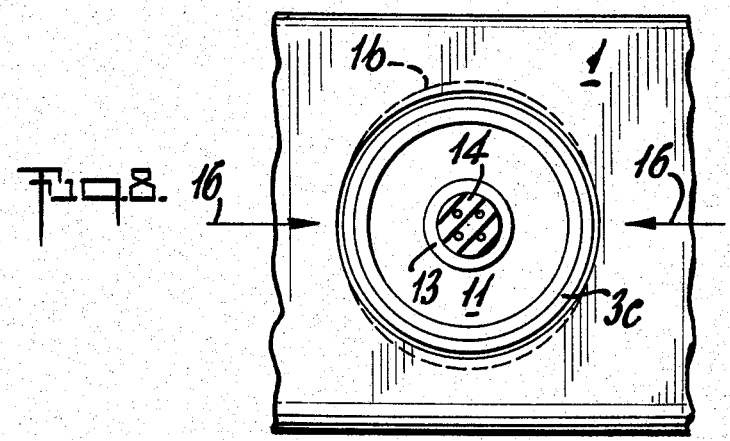

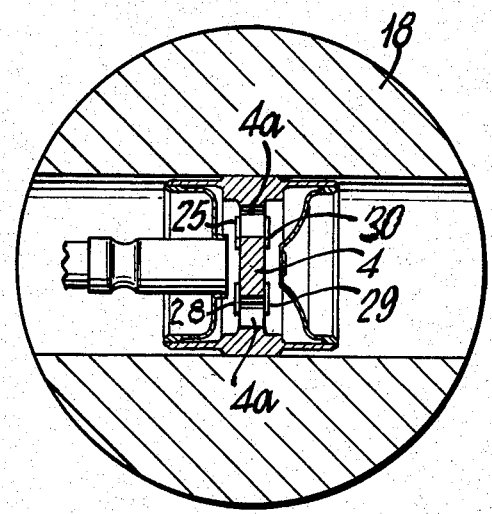
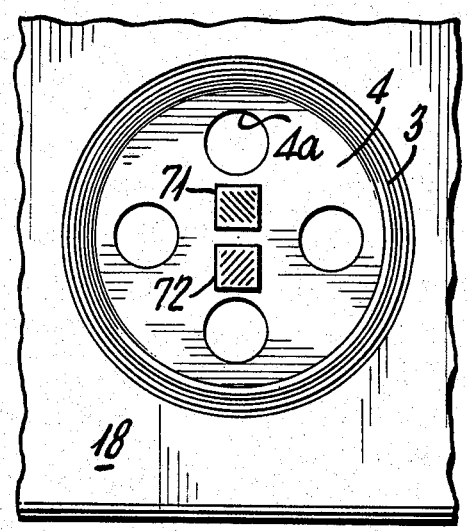
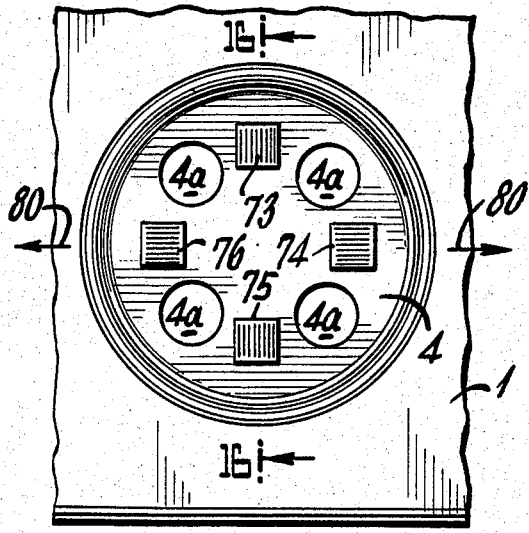
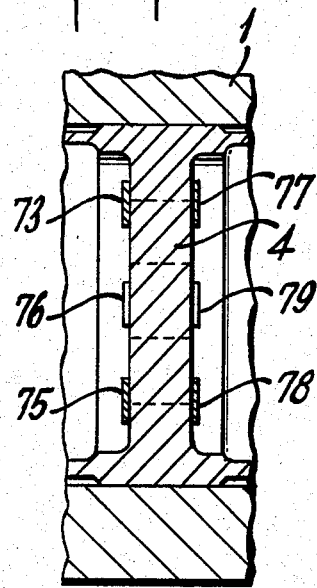
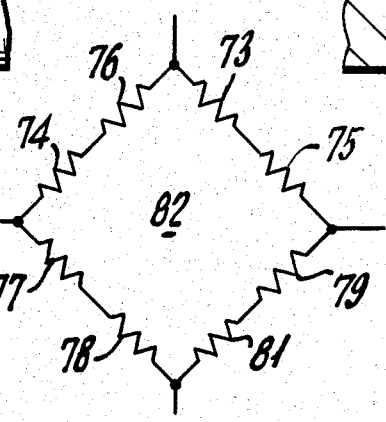

the# STRAIN MEASURING APPARATUS AND METHOD OF MAKING SAME

SUMMARY

This strain measuring apparatus is a device inserted in a hole in a member subject to stress, for the purpose of measuring the strain produced in the member by that stress. The member may be part of an existing structure, or it may be a new member. The strain measuring apparatus consists of a cylindrical shell with a middle portion knurled on its outer surface so that it has an overall diameter slightly greater than the diameter of the hole in which it is inserted. A web extends across the interior of the middle portion of the shell perpendicular to its axis. Strain gage elements are attached to surfaces of the web. The end portions of the shell may have a slightly smaller diameter than the hole in which the shell is inserted. The end surfaces are flattened to receive a force sufficient to press fit the shell into a hole formed in the member whose strain is to be measured. The ends of the shell are sealed by externally concave caps, each having a rim which is sealed to the inside of the end of the shell and a central portion extending inwardly of the shell to a locality adjacent but spaced from the web that carries the strain gage elements.

DRAWINGS

FIG. 4 is a sectional view taken on the line 4—4 of FIG. 2, looking in the direction of the arrows.

FIG. 5 is a wiring diagram of an electrical circuit including the strain gages of FIGS. 3 and 4.

FIG. 6 is a view similar to FIG. 2, but showing the apparatus of the invention in elevation.

FIG. 7 is a view similar to FIG. 1, showing the distortion of the strain measuring apparatus when subjected to a tensile stress.

FIG. 8 is a view similar to FIG. 1, showing the distortion of the measuring apparatus when subjected to compressive stress.

FIG. 13 is a cross-sectional view taken on the line 13—13 of FIG. 12.

FIG. 14 is a fragmentary elevational view similar to FIG. 12, showing another modification.

FIG. 15 is a similar fragmentary elevational view showing still another modification.

FIG. 16 is a cross-sectional view taken on the line 16—16 of FIG. 15.

FIG. 17 is a wiring diagram showing connections for the resistance elements in any modification using eight elements, such as FIGS. 12 and 15.

DETAILED DESCRIPTION

FIGS. 1-9

These figures illustrate one embodiment of the invention as applied to a member 1 which may be subject to either tensile or compressive stress in the horizontal direction, as indicated by the double headed arrow 2.

Figure 9:
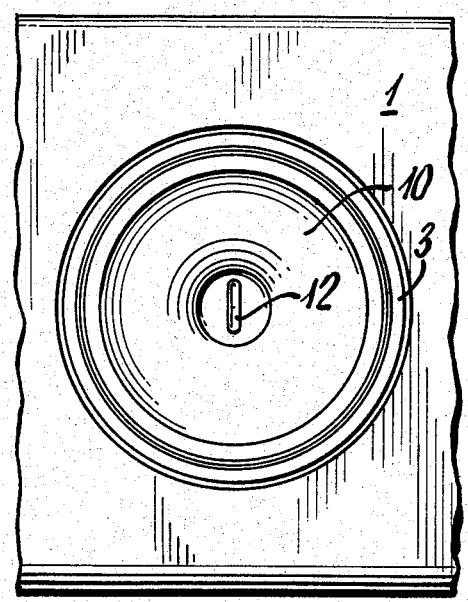
FIG. 9 is a right-hand elevational view of the apparatus of FIG. 2.

The member 1 has a cylindrical hole 1a drilled or bored from one side to the other. In the hole 1a there is pressfitted a shell 3 having a middle portion 3a which is knurled on its outer periphery as shown at 3b in FIG. 6 and two end portions 3c and 3d. The overall diameter of the middle portion 3a, including the knurled surface 3b is slightly (about 0.001"–0.008") greater than the diameter of the hole 1a. The outside diameter of the end portions 3c and 3d is slightly less than the diameter of the hole 1a. A web 4 extends across the middle portion 3a at right angles to the axis of the shell 3. The thickness of the web 4 is substantially less than the axial length of the knurled portion 3a. It is preferred to make the length of the knurled portion 3a at least twice the thickness of the web 4. This ratio may be increased, even to the point where the knurling extends to the full length of the shell 3. The web 4 may be provided with holes 4a for purposes of stress concentration. Two strain gage elements 5 and 6 are mounted on the left-hand side of the web 4, as viewed in FIG. 2. Two corresponding strain gage elements 7 and 8 are mounted on the right-hand surface of the web 4. The ends of the shell 3 are sealed by caps 10 and 11. The cap 10 has a concave external surface. Its periphery is sealed to the inner periphery of the end portion 3d of the shell. An inwardly extending central portion 10a of the cap 10 has a vertical ridge 12 (FIG. 9) formed in its innermost part, which serves to indicate the orientation of the wires on the strain gage elements 5,6,7,8. The cap 11 extends inwardly of the end portion 3c of the shell and is hermetically sealed at its center to a sheath 13 which is sealingly engaged to a cable 14 as shown by grooves 13a. The cable 14 includes wires attached to the strain gage elements 5,6,7,8. The end of the cable 14 inside the shell may be filled with plastic insulating and sealing material.

When the member 1 is subjected to tensile stress, as indicated by the arrows 15 in FIG. 7, the hole 1a distorts slightly to an elliptical cross-section as shown somewhat exaggerated in dotted lines in FIG. 7. This results in a compressive stress of the vertically extending strain gage elements 5 and 7, shortening those elements and decreasing their resistance. The horizontally extending strain gage elements 6 and 8 are subjected to a tensile stress, so that they are slightly elongated and their resistance is increased. Those four elements are connected in a Wheatstone bridge circuit 9 having a suitable input potential applied as shown in FIG. 5 and produce at the output terminals of that circuit a voltage which may be used as a measure of the strain to which the member 1 is subjected.

In a similar fashion, if the member 1 is subjected to a compressive stress as shown by the arrows 16 in FIG. 8, the strain gage elements 6 and 8 will be subjected to a compressive stress and the strain gage elements 5 and 7 will be subjected to a tensile stress. The hole 1a is at this time elongated vertically, as illustrated by the exaggerated dotted line position 1b in FIG. 8.

The externally concave, inwardly extending caps 10 and 11 are formed so that their central portions are as close as conveniently possible to the web 4. Since those caps 10 and 11 are connected to the stressed member 1 only through the relatively flexible end portions 3c and 3d of the shell, they tend to retain their original configurations when the member 1 is subjected to stress. They do not follow the distortion of the hole 1a, and they do not carry any substantial part of the stress applied to the member 1. They therefore do not affect the strain indication produced by the strain gage elements 5,6,7,8.

The web 4 must be within the portion 3a of the shell, which is closely held to the member 1 by the knurling 3b, so that the portion 3a and the web 4 must follow the deformation of the member 4 under stress.

While it would be possible to extend the knurling on the outside surface of the shell 3 so that it extends from end to end of the shell, such a structure would tend to transfer some of the stress of the member 1 through the caps 10 and 11 rather than through the web 4 and the accuracy of the resulting strain measurement would be adversely affected.

While the knurling 3b is the preferred means of connecting the shell 3 to the member 1, any other suitable projecting ridge configuration may be used, as long as it provides an overall diameter large enough as compared to the hole size to require a press fit for insertion of the shell into the hole.

When the member 1 is subjected to stress, part of that stress is transferred to the web 4, and distorts the web, producing a complex pattern of strains which vary in orientation in different parts of the web. By selecting the location and orientation of the strain gage elements mounted on the web, a principal strain of interest may be selected for measurement. The selected strain may be either tensile and compressive strains or torsional or shear strains.

FIGS. 7 and 8 show, with some exaggeration, the distortions of the member 1 when subjected to tensile and compressive stresses. Under those stress conditions the parts of the web 4 nearest the center are stressed principally in tension or compression, while the parts farthest from the center are stressed principally in shear or bending. The strain gage elements are placed as near the center as convenient in order to measure tensile and compressive strains.

The orientation indication provided by the ridge 12 enables the person press fitting the shell into the member 1 to do so with the strain gage elements, which are then concealed, properly oriented to measure the strains of interest.

Figure 1:
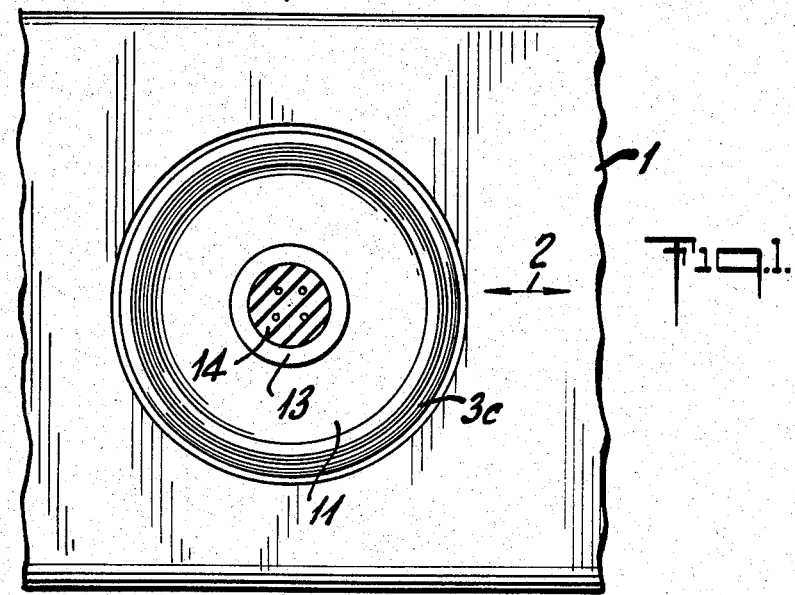
FIG. 1 is a fragmentary view of a member subject to tensile or compressive stress, in which has been inserted a strain measuring apparatus in accordance with the invention.
Figure 2:
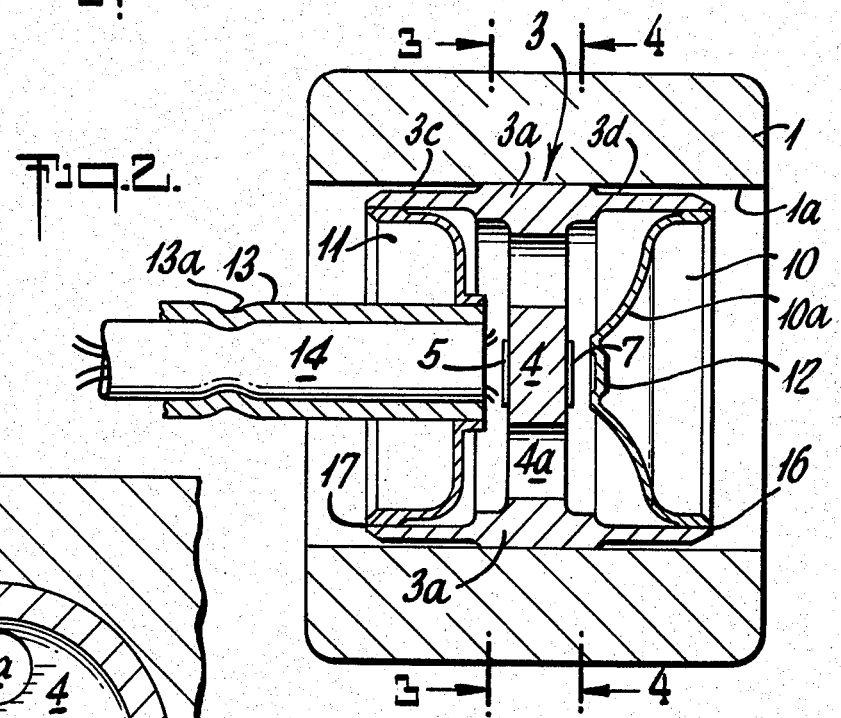
FIG. 2 is a sectional view taken on the line 2—2 of FIG. 1, looking in the direction of the arrows.
Figure 3:
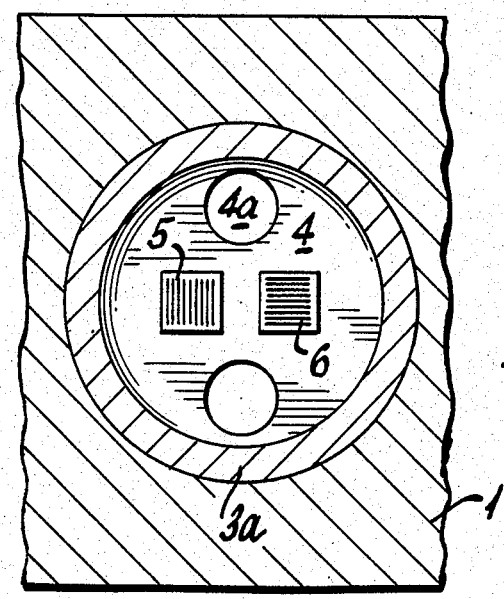
FIG. 3 is a sectional view taken on the line 3—3 of FIG. 2, looking in the direction of the arrows.

The shell 3 and the caps 10 and 11 are provided with aligned flat end surfaces, as illustrated at 16 and 17 in FIG. 2. The shell 3 together with the strain gage elements 5,6,7,8, the caps 10 and 11, the cable 14 and its sheath 13 are assembled outside the member 1. In fact, the assembly make take place at a considerable distance from the member 1, and the finished assembly may be stored for a substantial time before it is used. That member may have no holes drilled in it until just before the installation of the strain measuring apparatus. The installation is performed by pressing one of the end surfaces 16 and 17 to force the shell 3 into the hole 1a. The end surface 16 is preferred, since its use avoids any interference with the cable 14.

The overall diameter of the shell including the knurled surface 3b should exceed the diameter of the hole 1a by about 0.001" to 0.008". The end portions 3c and 3d of the shell may have an outside diameter less than that of the hole 1a by approximately 0.0625". This spacing is not critical.

When the shell 3 is press fitted into the hole 1a in the member 1, the web 4 is compressed radially. If the strain gage elements 5,6,7,8 are located at equal distances from the center of the web 1, and the knurling or other ridge configuration is generally uniform about the periphery of the shell 3, then all of the strain gage elements are stressed equally by this radial compression, and the balance of the bridge circuit 9 is not disturbed by the press fitting operation. The bridge circuit 9 may therefore be balanced before the press fitting takes place. Alternatively, the bridge may of course be balanced, e.g., by the use of resistors external to the shell 3, after the shell is press fitted into the hole 1a. In some cases, it may not be desirable to locate all the strain gage elements at equal distances from the center of the web 1.

The location of the strain gage elements on the web 4 and their orientation with respect to the neutral axis of the member 1 are determined by the particular type of stress it is desired to measure. The array of elements 5,6,7,8 in FIGS. 1-9 may be used to measure either tensile or compressive stress of the member 1. If that member is stressed in tension, then the bridge 9 is unbalanced in one sense. If the member 1 is stressed in compression, then the bridge 9 is unbalanced in the opposite sense.

The hole 1a in which the shell 4 is inserted should be located symmetrically with respect to the outer surfaces of the member 1. The invention may be applied to a stressed member of any cross-sectional configuration. The symmetrical location of the hole 1a is easily determined for a member of simple cross-sectional configuration, such as rectangular or circular. For more complex configurations, the center of the hole 1a should intersect the neutral axis of the member, and the neutral axis should pass through the web 4 after the shell 3 is inserted in the hole 1a.

FIGS. 10 AND 11

These figures illustrate a modified form of the strain measuring apparatus shown in FIGS. 1-9. In this modification, the strain gage resistance elements are within the holes 4a, instead of on the flat surfaces of the web 4. There are shown two gages 21 and 22 within the upper one of the holes 4a in FIGS. 10 and 11. Two other strain gages 23 and 24 are located within the lower hole 4a. When the structural member 1 is subjected to endwise compression, the strain gage elements 21 and 23 are stretched, thereby being strained in tension. The strain gages 22 and 24 are then strained in compression. When the member 1 is stressed in tension, the elements 21 and 23 are strained in compression, and the elements 22 and 24 are strained in tension.

The amplification of the strains which is introduced by the holes 4a in the web is at a maximum on the surfaces of those holes. Hence, the location of the gages 21,22,23,24 on those surfaces takes advantage of that maximum amplification.

The strain gages 21 and 23, which are connected in two opposite sides of the bridge circuit, are located at the same distance from the center of the member 1. The strain gages 22 and 24, which are connected in the other pair of opposite sides of the bridge circuit, are located at different distances from that center. However, the average distance from the center is the same as that of the gages 31 and 23. Consequently, there should be little or no unbalance of the bridge produced by the press fitting operation.

Figure 10:
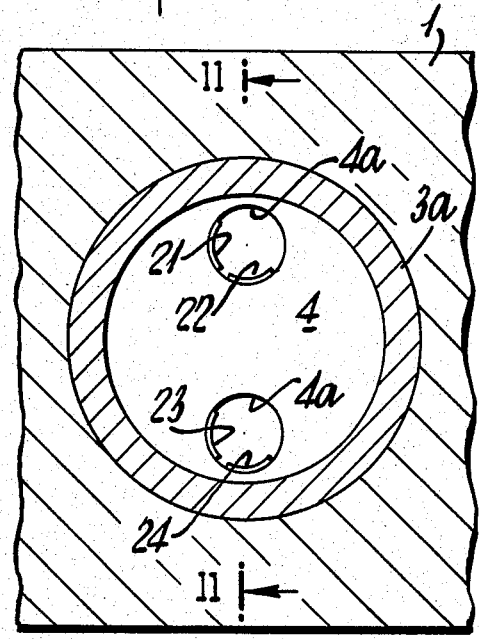
FIG. 10 is a cross-sectional view similar to FIG. 4, but showing a modification.
Figure 11:
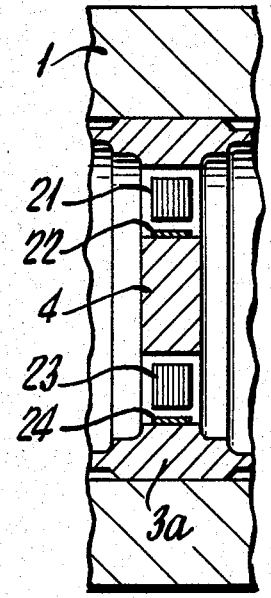
FIG. 11 is a cross-sectional view taken on the line 11—11 of FIG. 10, looking in the direction of the arrows.
Figure 20:
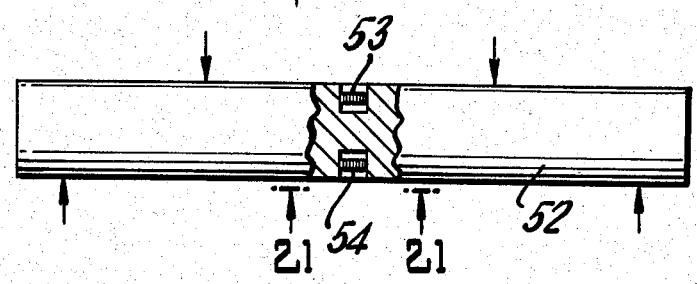
FIG. 20 is a somewhat diagrammatic view showing a modification of the invention as applied to a beam.

The other elements appearing in FIGS. 10 and 11 have been given the same reference numerals as in FIGS. 1-9 and will not be further described.

FIGS. 12-13

Figure 12:
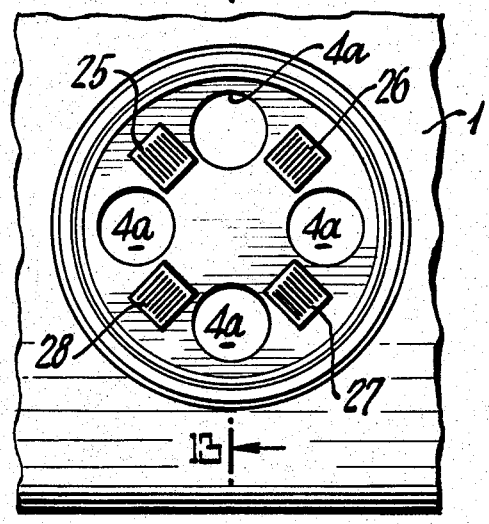
FIG. 12 is a fragmentary elevational view similar to FIG. 1, with a cap removed and showing another modification.

These figures illustrate an arrangement of the strain gage elements for measuring strains in shear, torsion or bending, rather than strains in tension or compression as in FIGS. 1-9. The web 4 is shown in these figures as being provided with four holes 4a. Increasing the number of holes increases the amplification of the stress applied to the strain gage elements. It is not necessary that four holes be used, or in fact that any holes in the web 4 be used. In some installations, it may be desirable not to make any holes such as those shown at 4a. FIG. 12 shows four strain gage elements 25,26,27,28, which are spaced radially outward from the center of the web 4, all being located at a common radius with respect to that center. On the opposite side of the web 4 there are located four similar strain gage elements, two of which are shown at 29 and 30 in FIG. 13. The strain gage elements 25,26,27,28,29,30 are located and oriented so that they measure principally variations in torsion or bending strain rather than tension or compression strains. The shell 3 is shown in these figures inserted in a member 18 of circular cross-section (see FIG. 13) such as a shaft or rod. This arrangement is particularly useful in measuring torque transmitted by such a member.

FIG. 14

FIG. 14 is a view similar to FIG. 12, showing the strain measuring apparatus according to the invention in which the strain gage elements are arranged more conventionally than in FIG. 12. In this figure, those elements which correspond to their counterparts in FIG. 12 have been given the same reference numerals. The shell 3 is the same as in FIG. 12, as is the web 4 and the holes 4a. The strain gage resistance elements 71 and 72 replace the four strain gage resistance elements 25,26,27,28 of FIG. 12, and are more conventionally arranged. The strain gage element 71 has the long dimension of its strain gage wire extending diagonally (about 45°) with respect to the radius from the center of the web 4. The strain gage resistance wire of the element 72 also extends diagonally with respect to that radius but at 90° with respect to the wires of the strain gage element 71. This arrangement of the resistance elements is conventional for a strain gage for measuring shear strain. The opposite side of the web 4 has two other resistance elements (not shown) with their wires extending in the same direction as the elements 71 and 72. The four resistance elements are connected in a bridge similar to that shown in FIG. 5.

FIGS. 15-17

These figures illustrate a modification similar in some respects to FIG. 12, but arranged for the measurement of tension or compression loads. Those elements having the same structure and function as in the previous figures have been given the same reference numerals. In these figures there are four holes 4a in the web 4. Each face of the web 4 has mounted thereon four strain gage elements. Those on the face appearing in FIG. 15 are numbered 73,74,75,76. Note that the wires in each of the elements 73,74,75,76 extend parallel to the principal radius through that element from the center of the web 4. The other face of the web 4 has four strain gage elements which appear as 76,77,78,79 in FIG. 16. When the member 1 is stressed in tension by an external force as indicated by the arrow 80 in FIG. 15, the four elements 74,76, 79,81 are also stressed in tension. These four elements are connected in opposite arms of a bridge circuit generally shown at 82 in FIG. 17. The four elements 73,75,77,78 are strained in compression at that time. The strains due to such an external force 80 strain all of the strain gage elements to unbalance the bridge circuit 82.

A similar bridge circuit may be used in connection with the strain measuring apparatus of FIGS. 12 and 13.

When the strain gage elements are arranged as shown in FIGS. 15-17, then the bridge circuit 82 may be balanced before the shell 3 is press fitted into the member 1. During that press fitting all of the strain gage elements are strained in the same sense and by the same magnitude of stress. Hence, the press fitting operation does not affect the balance of the bridge circuit.

The same effect is obtained with the modification shown in FIGS. 12 and 13.

FIGS. 18-19

Figure 18:
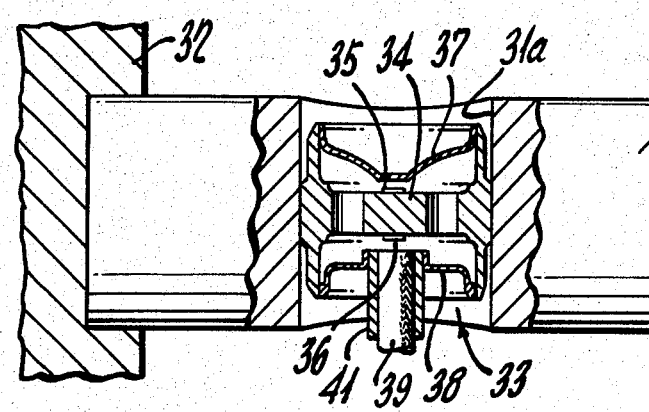
FIG. 18 is a view partly in plan and partly in crosssection, showing the strain measuring apparatus of FIG. 2 as applied to a cantilever beam.

FIG. 18 illustrates the invention as applied to the measurement of strain in a cantilever beam 31. FIG. 14 is a plan view, looking downwardly on the beam which is fixed at its left end in a support 32. A shell 33 is press fitted into a horizontally extending hole 31a in the beam 31. The shell 33 is provided with a web 34 carrying strain gage elements, two of which are shown at 35 and 36. The upper end of the shell 33 is closed by a cap 37. The lower end of shell 33 is closed by cap 38 and by a cable 39 encircled by a sheath 41. Since the stresses to be measured in a beam of this sort are principally shear stresses, the configuration of the strain gage elements should be similar to that shown in FIGS. 12 and 13. However, many configurations of strain gage elements suitable for measuring bending or shear stresses are known in the art. It is assumed that the external force being measured is downward, i.e., directed perpendicular to the plane of the paper.

Figure 19:
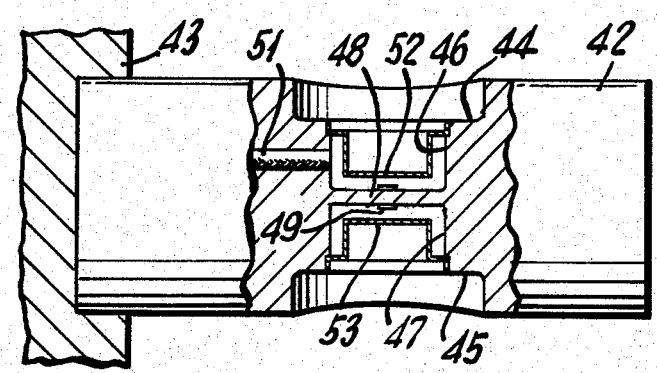
FIG. 19 is a cross-sectional view similar to FIG. 18, showing a prior art strain measuring apparatus.
Figure 22:
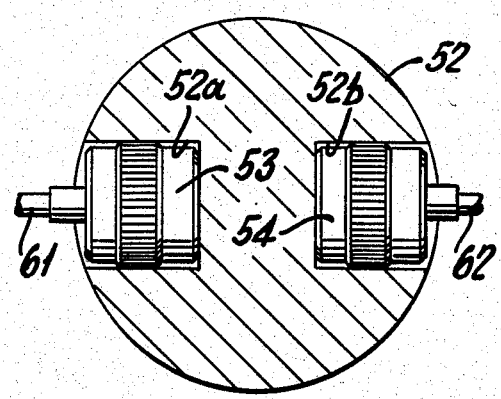
FIG. 22 is a cross-sectional view taken on the line 22—22 of FIG. 21.
Figure 21:
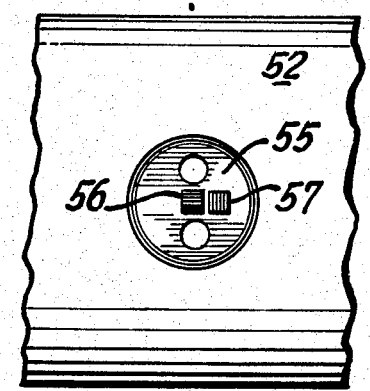
FIG. 21 is a fragmentary plan view of part of the beam of FIG. 20, on an enlarged scale, with a cap removed from the strain measuring apparatus, and taken on the line 21—21 of FIG. 20.

FIG. 19 shows a prior art arrangement for measuring stress in a cantilever beam 42 anchored in a support 43. In this structure, a recess 44 is drilled into one side of the beam and another recess 45 into the opposite side. A smaller diameter recess 46, concentric with the recess 44 is drilled into the middle of the bottom of recess 44. A similar concentric recess 47 is drilled into the middle of recess 45. The bottoms of the recesses 46 and 47 define between them a web 48 which is part of the original beam structure. Strain gage elements 49 are fixed on the web and are electrically connected by a cable 51 to external electrically responsive elements. Caps 52 and 53 are placed within the recesses 46 and 47 to close their outer ends. Suitable holes may be drilled in the web 48 to accommodate electrical connections between the cable 51 and the strain gage elements on the lower side of that web.

It should be apparent that the manufacture of the strain measuring elements of FIG. 19 is much more complex than that of the present invention, shown in FIG. 18. The drilling of holes, placement of strain gage elements, caps, and the like must be done on the beam 42 in the prior art arrangement of FIG. 19. According to the present invention, as shown in FIG. 18, all those operations will be carried on in a suitable shop at a location removed from the beam 31. The only operation that has to be done at the beam 31 is the drilling of the hole 31a and the force fitting of the shell 33 into that hole.

FIGS. 20-22

These figures illustrate an application of the invention to a beam 52 of circular cross-section for measuring bending or flexural strains. The beam is shown diagrammatically as being supported adjacent its ends, and as being subject to loads between its ends. As shown in these figures, two blind holes 52a and 52b are drilled into the beam at top and bottom. Into the holes 52a and 52b there are press fitted shells 53 and 54, each of which includes a web 55 carrying two strain gage resistance elements 56 and 57. The shells 53 and 54 are provided with external cable connections, shown at 61 and 62.

Instead of using two blind holes as shown at 52a and 52b, a single hole may be drilled all the way if the load on the beam permits. The two shells 53 and 52 may then be force fitted in from either end of the hole or from each end of the hole. An electrical connection for one of the shells may then go through the hole and through the other shell, instead of having separate external connections, as shown.

When a device constructed in accordance with the present invention is inserted into a newly drilled hole in a member which is already under stress, for example a beam in a loaded structure, then the device only measures any change from the existing stress. It does not measure the stress existing at the time of the drilling of the new hole. This device, when installed in an existing hole is also capable of indicating the magnitude of strain that would result from deformation of the hole caused by external forces.

I claim:

1. Strain measuring apparatus adapted for press fitting into a hole in a member to measure strains in said member, comprising:
   a. a hollow cylindrical shell having:
      1. a middle portion with externally projecting knurled ridge means, the overall diameter of the shell and ridge means taken together being greater than the diameter of the hole; and
      2. end portions having smaller diameters than the hole;
   b. a web extending across the interior of said middle portion of the shell perpendicular to the axis thereof;
   c. at least one strain gage element on the web; and
   d. an end surface on the shell for the application thereto of a force sufficient to press fit the shell completely into the hole.

2. Strain measuring apparatus adapted for press fitting into a hole in a member to measure strains in said member, comprising:
   a. a hollow cylindrical shell including a middle portion having an overall diameter slightly greater than the diameter of the hole and end portions having smaller diameters than the hole;
   b. a web extending across the interior of said middle portion of the shell perpendicular to the axis thereof, said web having holes therein to concentrate the strains in the remaining parts of the web;
   c. at least one strain gage element on the web; and
   d. an end surface on the shell for the application thereto of a force sufficient to press fit the shell completely into the hole.

3. A load cell as in claim 2, including a plurality of strain gages on the flat surfaces between the holes.

4. A load cell as in claim 2, including a plurality of strain gages affixed to the inside surfaces of the holes.

5. Strain measuring apparatus adapted for press fitting into a hole in a member to measure strains in said member, comprising:
   a. a hollow cylindrical shell, including a middle portion having an overall diameter slightly greater than the diameter of the hole and end portions having smaller diameters than the hole;
   b. a web extending across the interior of said middle portion of the shell perpendicular to the axis thereof;
   c. at least one strain gage element on the web, and
   d. an end surface on the shell for the application thereto of a force sufficient to press fit the shell into the hole; and
   e. hermetic seal means at each end of the shell.

6. A load cell as in claim 5, in which:
   a. the strain gage element is electrically responsive to variations in strain; and
   b. the load cell includes a cable for conductors connected to the electrically responsive strain gage element and extending through one of the seal means.

7. A load cell as in claim 5, including externally visible means on the outside of one of the hermetic seal means to indicate the orientation of the strain gage element.

8. Strain measuring apparatus for press fitting into a hole in a member to measure strains in said member, comprising:
   a. a hollow cylindrical shell, including a middle portion having an overall diameter slightly greater than the diameter of the hole and end portions having overall diameters less than the diameter of the hole;
   b. a web extending across the interior of said portion of the shell perpendicular to the axis thereof, said middle portion being axially longer than the thickness of the web;
   c. at least one strain gage element on the web; and
   d. an end surface on the shell for the application thereto of a force sufficient to press fit the shell into the hole; and
   e. caps hermetically sealing the ends of the shell.

9. A load cell as in claim 8, in which each of said caps is externally concave, having a rim sealed to an end of the shell and a middle portion located inwardly of the shell from its associated end.

10. Apparatus for measuring strain, including:
    a. a member subject to opposing force applied at spaced localities and having two blind holes aligned and extending inwardly of the member from opposite surfaces thereof;

b. two hollow cylindrical shells, one for each of said holes, each having an axial length shorter than the depth of the hole and having an overall unstressed diameter slightly greater than the diameter of the hole, each said shell being press fitted completely within its associated hole;

c. a web extending across the interior of each shell perpendeicular to the axis thereof; and d. at least one strain gage element on each web.

11. The method of measuring strains in a member, comprising the steps of:

a. making a cylindrical hole in the member;

b. press fitting into the hole a hollow shell having an overall diameter slightly greater than the hole diameter; said shell including:
 1. a web extending across the shell perpendicular to the axis thereof;
 2. at least one strain gage element on the web; and
 3. externally visible means indicating the orienation of the strain gage;

c. rotating the shell to bring the strain gage into a predetermined orientation with respect to the structural member before press fitting the shell into the hole; and d. measuring the strain on said strain gage element.

12. The method of measuring strains in a member, comprising the steps of:

a. making a cylindrical hole in the member;

b. press fitting into the hole a hollow shell having an overall diameter slightly greater than the hole diameter; said shell including:
 1. a web extending across the shell perpendicular to the axis thereof; and
 2. a plurality of strain gage elements on the web, said elements being connected in a balanced bridge circuit; and
 3. all said elements are spaced equal distances from the center of the web and having their long dimensions extending radially with respect to that center, so that the strains induced therein by the press fitting step do not affect the balance of the bridge circuit; and c. measuring the strain on said gage elements.

* * * * *